Jan. 16, 1934. W. FABRICK 1,943,470
FRUIT JAR SEALER AND TIGHTENER
Original Filed Feb. 2, 1932   2 Sheets-Sheet 1
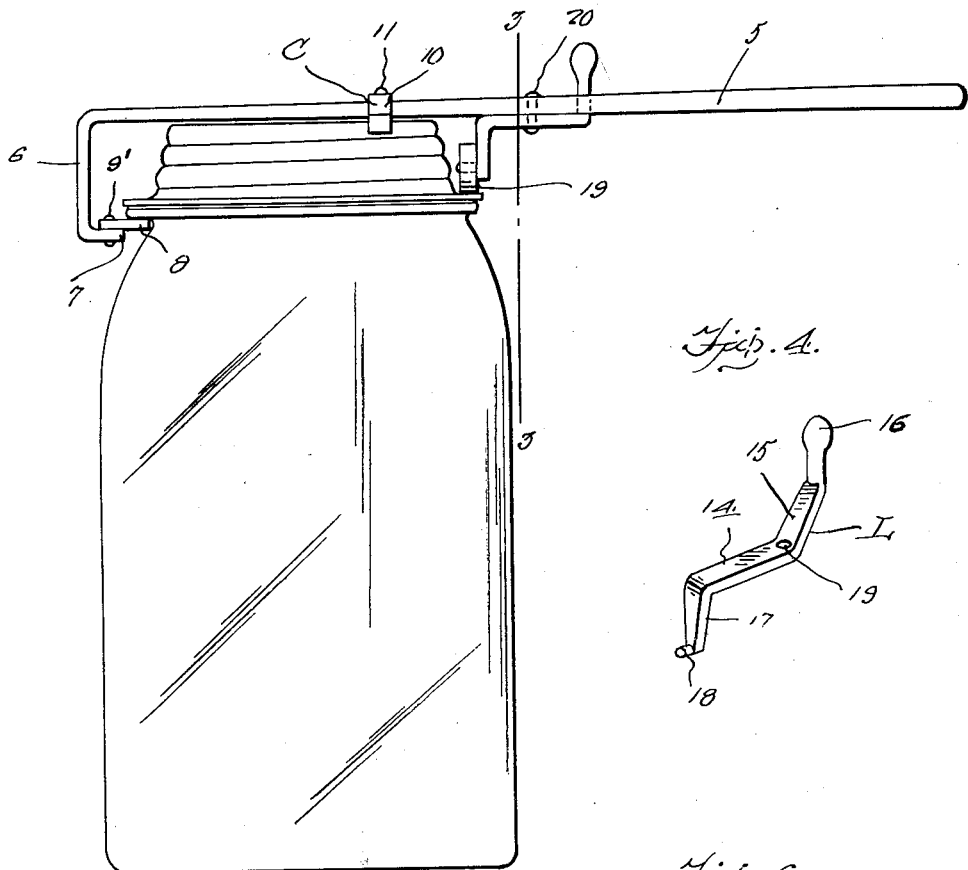
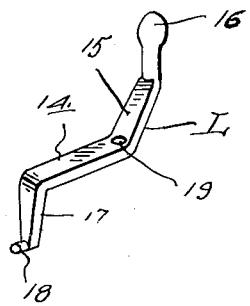
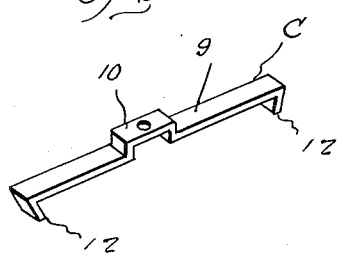
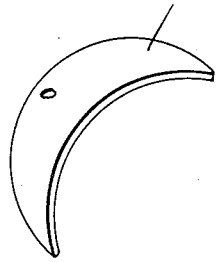
Inventor
Walter Fabrick
By Clarence A. O'Brien
Attorney

Patented Jan. 16, 1934

1,943,470

UNITED STATES PATENT OFFICE 1,943,470

FRUIT JAR SEALER AND TIGHTENER

Walter Fabrick, Elgin, Ill.

Application February 2, 1932, Serial No. 590,443
Renewed October 18, 1933

3 Claims. (Cl. 81—15.1)

The present invention relates to a fruit jar sealer and tightener and has for its prime object to provide a device of this nature which is exceedingly simple in its construction, inexpensive to manufacture, easy to handle and manipulate, thoroughly efficient and reliable in use and operation and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a device embodying the features of my invention showing the same applied to a fruit jar.

Figure 4 is a perspective view of the lever.

Figure 5 is a perspective view of the guide plate, and

Figure 6 is a perspective view of the spring clip.

Figure 2:
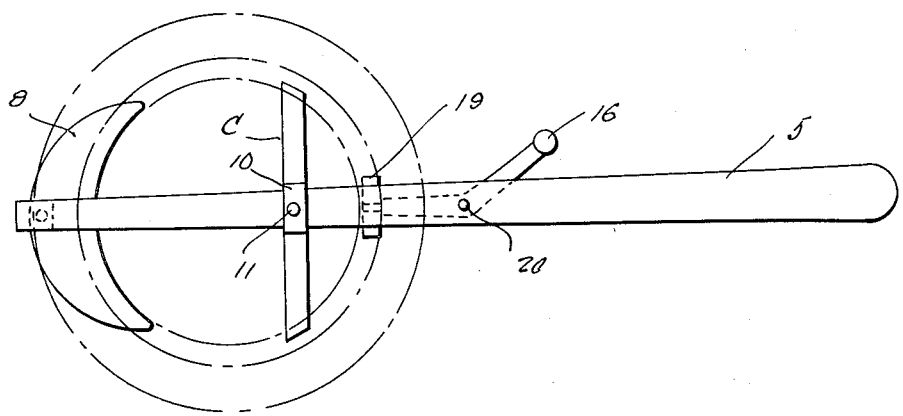
Figure 2 is a top plan view thereof.
Figure 3:
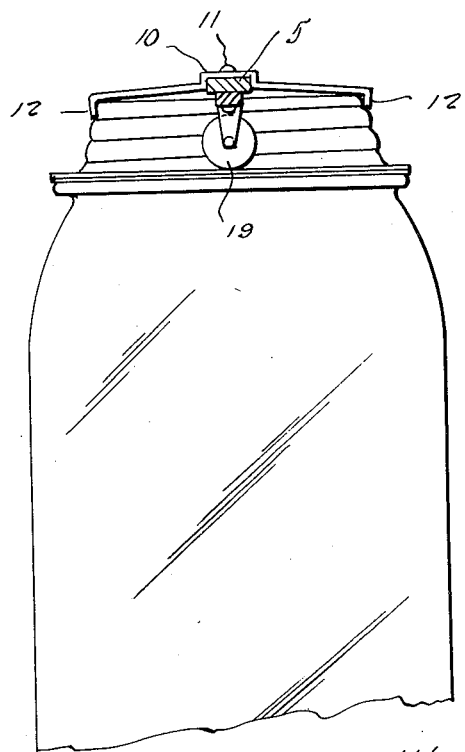
Figure 3 is a sectional view taken on the line 3—3 of Figure 1.

Referring to the drawings in detail it will be seen that the numeral 5 denotes an elongated handle bar one end of which merges into a depending extension 6 terminating in an ear 7 disposed in parallelism with and under the handle bar 5. An arcuate or crescent shaped guide plate 8 is fixed on top of the ear 7 by suitable means 9'. A spring clip C includes an elongated body 9 having an upwardly offset central portion 10 disposed over an intermediate portion of the bar 5 and fixed thereto by suitable means 11. The body 9 terminates at its ends in depending downwardly converging lips 12, adapted to engage relatively opposite sides of the jar cap, whereby the clip C serves to maintain the handle 5 substantially parallel with the top of the cap and the plate 8 engaged with the under side of the lip or rim usually provided on the jar. The letter L denotes a lever comprising a body 14, one end of which is obliquely disposed at 15 and terminates in an upstanding handle 16.

The other end of the body 14 merges into a depending portion 17 which terminates in an outwardly directed trunnion 18 on which is journalled a roller or wheel 19. At the juncture of the body 14 with the oblique extension 15 there is an opening 19 through which extends a pin or the like 20 to rockably fasten the body under the handle 5 between the end thereof opposite to the extension 6 and the clip 6.

This device will seal and tighten all jar covers and straighten out any kinks which happen to be around the edges, thus preventing fermentation. In opening fruit jars one can pry the cover and thus save the rubber for future use and the device will straighten the edges of the cover when used again.

To seal the jar, first screw on the cover by hand and then adjust the device over the cover hooking the plate 8 under the lower lip of the rim on the jar, and then engage the clip with the top of the cap. Then pull the lever L toward the handle bar 5 thus placing the wheel or roller 19 on the edge of the cap. Pull the handle bar towards you slightly bearing down on the handle bar and run completely around the edge of the cap and the lid is sealed and tightened. Release the lever and lift the device off the cap.

It is thought that the construction, operation, utility and advantages of this invention will now be quite apparent to those skilled in this art without a more detailed description thereof.

The present embodiments of the invention have been disclosed in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

1. A device of the class described including an elongated handle bar merging at one end into a depending extension which terminates in an ear underslung with respect to the bar, an arcuate plate fixed to the ear, a lever rockable under the bar, a wheel rotatable on the lever, said lever having a depending extension at one end with a trunnion thereof on which the wheel is rotatable, and at the other end provided with an oblique extension terminating in an upstanding handle.

2. A device of the class described including an elongated handle bar merging at one end into a depending extension which terminates in an ear underslung with respect to the bar, an arcuate plate fixed to the ear, a lever rockable under the bar, a wheel rotatable on the lever, said lever having a depending extension at one end with a trunnion thereof on which the wheel is rotatable, and at the other end provided with an oblique extension terminating in an upstanding handle, a cross clip on the bar between the lever and the extension of the bar.

3. A tool for the purpose specified comprising in combination a handle member, means on one end of said handle member to engage the jar neck under its gasket flange, a clip carried by said handle member and adapted to engage a jar cap, an angular lever pivoted intermediate its ends to said handle member remote from said clip, a roller on one end of said lever adapted to roll out crimps in the jaw cap flange, and said lever having a free end portion, and a handle on said free end portion arranged for lateral engagement with the first named handle member.

WALTER FABRICK.